United States Patent
Zmölnig et al.

(10) Patent No.: US 12,182,642 B2
(45) Date of Patent: Dec. 31, 2024

(54) PLASTIC CONTAINER AND METHOD FOR DETERMINING A PROPERTY OF A PLASTIC CONTAINER

(71) Applicant: ALPLA Werke Alwin Lehner GmbH & Co. KG, Hard (AT)

(72) Inventors: Christian Zmölnig, Schwarzach (AT); Thomas Bohle, Alberschwende (AT)

(73) Assignee: ALPLA Werke Alwin Lehner GmbH & Co. KG, Hard (AT)

( * ) Notice: Subject to any disclaimer, the term of this patent is extended or adjusted under 35 U.S.C. 154(b) by 30 days.

(21) Appl. No.: 18/027,519

(22) PCT Filed: Sep. 20, 2021

(86) PCT No.: PCT/EP2021/075807
§ 371 (c)(1),
(2) Date: Mar. 21, 2023

(87) PCT Pub. No.: WO2022/058588
PCT Pub. Date: Mar. 24, 2022

(65) Prior Publication Data
US 2023/0376701 A1    Nov. 23, 2023

(30) Foreign Application Priority Data
Sep. 21, 2020   (CH) ...................................... 1192/20

(51) Int. Cl.
*G06K 19/06*      (2006.01)
*B65D 1/02*       (2006.01)
(Continued)

(52) U.S. Cl.
CPC ........... G06K 1/121 (2013.01); B65D 1/0207 (2013.01); G06K 19/06037 (2013.01); G09F 3/0297 (2013.01); B65D 2203/06 (2013.01)

(58) Field of Classification Search
CPC ....... G06K 19/06037; G06K 19/06159; B65D 1/0207; B65D 2203/06
(Continued)

(56) References Cited

U.S. PATENT DOCUMENTS

| 2014/0231426 A1* | 8/2014 | Ichikawa | B65D 1/0207 220/62.11 |
| 2021/0101711 A1* | 4/2021 | Brown | B29C 49/00 |
| 2022/0152910 A1* | 5/2022 | Kunz | B29C 49/30 |

FOREIGN PATENT DOCUMENTS

| CH | 663 677 A5 | 12/1987 |
| EP | 3 235 756 A1 | 10/2017 |

(Continued)

OTHER PUBLICATIONS

Machine translation of EP 3 461 761 A1, Giesecke+Devrient Currency Technology Gmbh, Apr. 3, 2019, pp. 1-14 (Year: 2019).*

(Continued)

*Primary Examiner* — Paultep Savusdiphol
(74) *Attorney, Agent, or Firm* — Finch & Maloney PLLC

(57) ABSTRACT

The invention relates to a plastic container (100) having a container wall (102) with an outside (10) and an inside. A surface (11) of the outside (10) has a structure at least in a first region (30). Said structure is formed by elevations (31) and/or recesses (32). Each elevation (31) or recess (32) has one or more boundary faces (33). Each transition from a first boundary face (33) to a second boundary face (33) or to the surface (11) of the container wall (102) has a radius, which is less than or equal to 5 μm. The invention also relates to a method for determining a property of a plastic container and verifying the authenticity.

18 Claims, 2 Drawing Sheets

Figure 1:
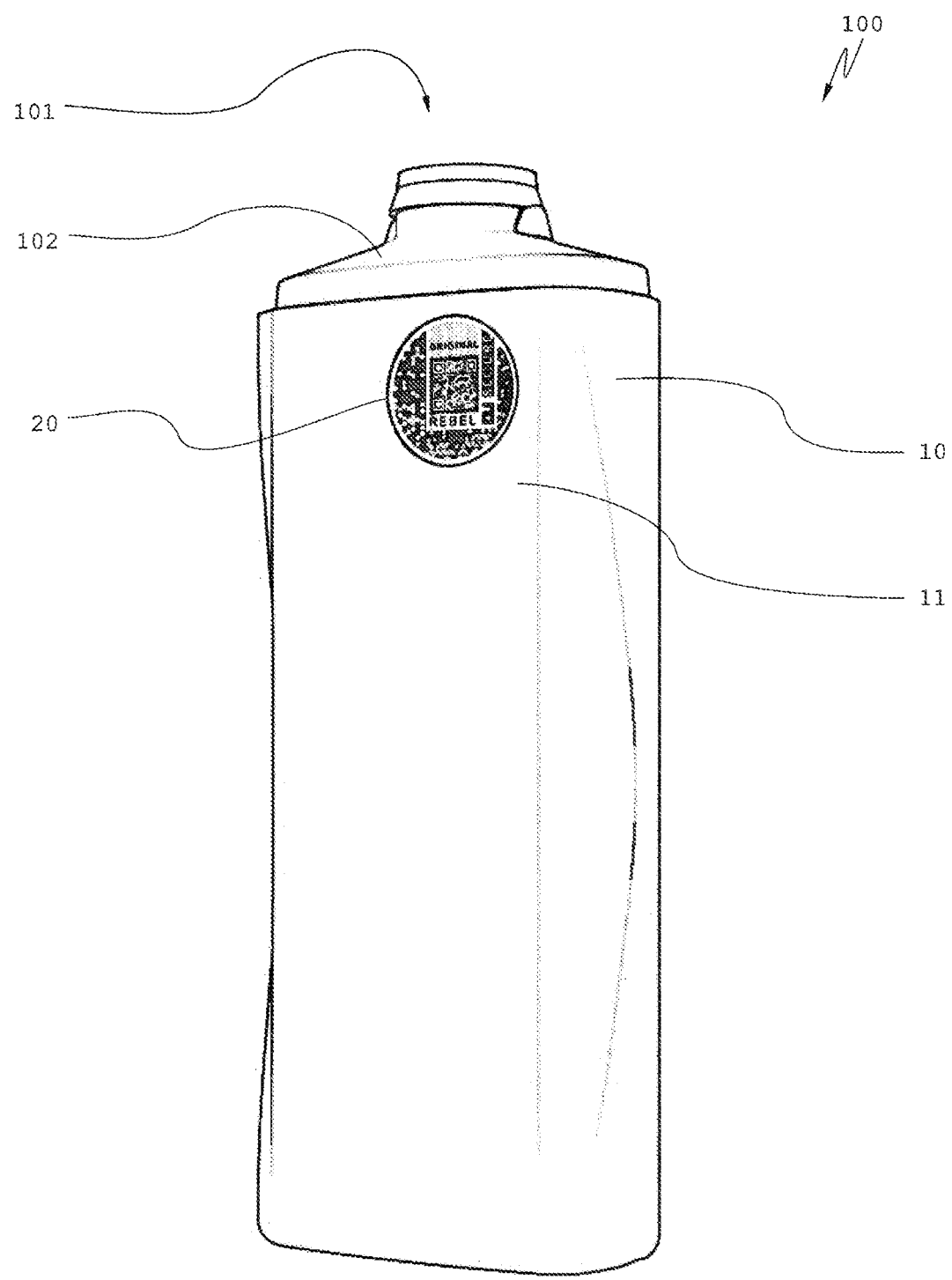

(51) Int. Cl.
*G06K 1/12* (2006.01)
*G09F 3/00* (2006.01)

(58) Field of Classification Search
USPC .................................................. 235/494, 490
See application file for complete search history.

(56) References Cited

FOREIGN PATENT DOCUMENTS

| EP | 461 761 A1 | 4/2019 |
|----|------------|--------|
| WO | 2018/184016 A1 | 10/2018 |
| WO | 2020/201062 A1 | 10/2020 |
| WO | 2020/201063 A1 | 10/2020 |

OTHER PUBLICATIONS

International Search Report Corresponding to PCT/EP2021/075807 mailed Jan. 11, 2022.
Written Opinion Corresponding to PCT/EP2021/075807 mailed Jan. 11, 2022.

* cited by examiner

PLASTIC CONTAINER AND METHOD FOR DETERMINING A PROPERTY OF A PLASTIC CONTAINER

The present invention relates to a plastic container, a method for determining a property of a plastic container and a method for verifying the authenticity of a plastic container according to the respective preambles of the independent claims.

Single-layer or multi-layer plastic containers, for example made of polyolefins, are often produced in an extrusion blow molding method, in particular in a parison blow molding method. In this case, an extrusion head is normally used to continuously extrude a plastic parison which can be formed in one or more layers. The plastic parison is introduced in sections into a mold cavity of a blow molding tool, brought into the desired shape by means of a blowing medium introduced at overpressure, cooled, and demolded. The blow molding tool usually consists of two blow mold halves, in each of which one half of the mold cavity is formed. The blow mold halves are periodically opened, closed, and opened again in order to introduce a parison section into the mold cavity and, after inflation, to demold the finished container again. Preferably, polyolefins, such as polypropylene (PP), high-density polyethylene (HDPE), or low-density polyethylene (LDPE) are used in the extrusion blow molding method.

The injection blow molding method (IBM) represents a further production method for plastic containers that is used in practice. In this method, for example, a so-called preform, which mostly has an elongated tubular shape and has, at its one longitudinal end, a bottom and, at the other longitudinal end, a neck region with shaped fastening elements for a closure cap, for example threaded sections, is inserted into a mold cavity of a blow molding tool and is brought into the desired shape by a compressible blowing medium introduced at overpressure. After the blowing process, the finished plastic container is cooled and demolded from the blow molding tool.

The single-layer or multi-layer preform is typically produced in a separate injection molding method prior to the injection blow molding process (IBM). It has also already been proposed to produce preforms in a plastic compression molding method or by an extrusion blow molding process. The raw material used for the production of plastic containers in the injection blow molding process (IBM) is primarily polyethylene terephthalate (PET) and similar materials, such as polyethylene furanoate (PEF). It is also known to use polyolefins, polystyrenes, PVC, PLA and similar materials for the production of preforms.

Also normally used in the injection blow molding process (IBM) is a blow molding tool which consists of two blow mold halves in each of which a part of the mold cavity is formed. The blow mold halves are periodically opened, closed, and opened again in order to insert and inflate the preform and to demold the finished plastic container.

The extruded parison and also the preform are uniformly referred to as preforms in their respective methods.

Thanks to the possibility of producing high-quality containers which are, for example, food-safe and in which a product has a long shelf life without spoiling and/or changing, exclusive products are increasingly also being packaged in plastic containers.

Product piracy is a problem known for a long time, and means for combating it are becoming increasingly important, in particular against the background that expensive and/or exclusive products are affected thereby.

In order to indicate something about the authenticity of a content of a container, most containers are provided, for example, with a destroyable quality seal. However, this indicates nothing about the origin of the bottle or whether this bottle together with its content is a counterfeit.

Efforts were therefore made to design counterfeit-proof containers. It has been provided, for example, to print containers, label them with lasers, or to attach labels, which contain specific information, to the containers, and it can be determined on the basis of this information whether or not this is an authentic product. The disadvantage here is that such labels can be switched or the containers can be subsequently printed or labeled.

Similarly, there are efforts to be able to continuously identify containers, for example, during a production process, for example in medical technology.

EP 3 235 756 A1 discloses a bottle cap with an identification code. The identification code is applied with color onto the bottle cap and such that it is situated partially inside. Bottle caps can, however, be exchanged between different containers so that, for example after the container has been opened for the first time, it is no longer comprehensible which bottle cap belongs to which container. Moreover, such a marking is difficult to apply and/or is partially not resistant to mechanical action. Moreover, such markings have to have a specific size since application of ink does not allow any small resolution of the corresponding identification code since there is a risk of the color running or smearing, in particular in the case of very fine or thin lines and/or markings.

It is therefore an object of the invention to eliminate at least one or more disadvantages of the prior art. In particular, a plastic container is to be provided which makes it possible to arrange and/or conceal information and/or identifying features in or on specific regions of the plastic container. In particular, the plastic container should have a quality and aesthetically sophisticated appearance. Preferably, a method is also to be provided which makes it possible to determine a property of a plastic container, in particular a method for verifying the authenticity of a plastic container or a filling material contained therein.

This object is achieved by the devices and methods defined in the independent claims. Further advantageous embodiments arise from the dependent claims.

A plastic container according to the invention has a container wall with an outside and an inside. A surface of the outside has a structure at least in a first region. This structure can be designed in relief and is formed by elevations and/or recesses. Each elevation or recess has one or more boundary faces. A transition from a first boundary face to a second boundary face or to the surface of the container wall has a radius that is less than or equal to 5 μm. Preferably, the radius is less than or equal to 1 μm, in particular less than or equal to 0.5 μm.

A structuring, as described herein, of elevations and/or recesses makes it possible to give the surface in this region a corresponding texture, the individual components of which can no longer be distinguished by the naked eye. Very fine texturing can be created by the corresponding radii. For a radius of 5 μm, the theoretical intersection points of the respective boundary faces can be spaced apart from one another at correspondingly short distances.

The structuring is a component of the container and thus an integral component of the container. Associated information is thus an inherent component of the container.

In order to define the term "boundary face," it is explained herein by way of example with reference to a structuring which has a saw-tooth cross section. Each tooth is designed as a triangle, said triangle being connected at its base to the substrate. Each triangle has a highest point. Between two triangles is a lowest point. Toward the environment, each triangle thus has two boundary faces which each extend from a lowest point to the highest point. The boundary faces intersect at these points.

These points thus define a sharp transition of boundary faces.

As explained, this transition is not infinitely sharp but rather has a radius as described herein. The intersection points of the boundary faces are thus theoretical intersection points of the extension of the respective boundary faces.

In the case of other cross sections, more boundary faces may be present. A triangular face with a cut-off tip, i.e., a trapezoidal structure, has an additional, upper boundary face, to which the present definition also applies.

Boundary faces thus extend substantially between two theoretical intersection points.

Such a fine texture on the surface makes it possible, for example, to already incorporate specific flaws into this texture, which flaws are not discernible by the naked eye but can be read out, for example, with a corresponding optical system. Depending on the presence or absence of such a flaw, a conclusion can be drawn as to whether or not the container is a container of the right manufacturer.

The region having the structure can be raised or recessed in the surface of the container in the form of a character, a geometric figure, or a symbol.

In other words, the region can have a correspondingly shaped outer contour, it extending into the surface of the container or protruding from this surface. Different effects can thus be achieved on the surface of the container. For example, a lettering can be provided in which each letter has a corresponding structure. The lettering can provide a first information, for example the manufacturer's name.

The structure of each letter can be designed as in the present case. The structure can also have corresponding information. For example, for the specific manufacturer, a structure can be provided which has a specific sequence of recesses and/or elevations and is unique for this manufacturer. If the formation of the structure now corresponds to the name of the manufacturer or the corresponding character, the corresponding geometric figure or the respective symbol, it can be determined whether this container actually originates from the manufacturer represented on the container or not.

The raised or recessed region has a mean height or a mean depth that does not exceed 25 μm and in particular is less than 10 μm. Preferably, the mean height or the mean depth is less than 5 μm.

The geometric center of the structure of the region is taken into account as the mean height or mean depth.

These dimensions make it possible for the corresponding regions to be separated visually from the rest of the surface. Such a sharp delimitation can likewise be easily resolved, for example, with an optical system and can be processed in a corresponding image processing program.

The surface can have a plurality of regions. These can be arranged in the form of a QR code or a barcode. The arrangement of the regions is preferably such that these regions represent machine-readable information.

Alternatively, the machine-readable information can also be provided in a different form than that of a QR code or a barcode.

Both QR codes and barcodes can be read by a multiplicity of devices, for example, smartphones. With a corresponding link to a central computer, for example via an app, an end customer can already check the authenticity of the container in a store or obtain information about its content or nature.

The machine-readable information may contain details about the material of the plastic container, about the filling material, about the production batch, about the deposit system assigned to the plastic container, about the manufacturer of the plastic container or of the filling material. It is understood that a plurality or all combinations of these information items are possible.

On the one hand, this allows the manufacturer to provide specific information, and on the other hand, a customer can obtain corresponding information, for example in relation to an incompatibility of an ingredient or, as already stated, to check the authenticity.

The machine-readable information may be provided by the position of two or more regions relative to one another, in particular by the distance between them, and/or by the rotation thereof relative to one another, and/or by a different combination of the structures of two or more regions.

This allows a simple assignment of the corresponding design of the regions to a respectively associated property. A combination of a plurality of the aforementioned elements also allows a multiplicity of information items to be provided.

The plastic container is preferably produced in the extrusion blow molding method. This method is cost-effective and suitable for processing polyolefins.

The plastic container is preferably produced as a single-layer plastic container.

The plastic container can be produced from a polyolefin, in particular from polypropylene, HDPE or LDPE. In addition, it is possible to produce plastic containers according to the invention in particular in the extrusion blow molding method using these materials without the cycle times having to be significantly increased in the process.

In order to produce the plastic container, an extrusion blow molding method is preferably used as described and claimed in the international patent application PCT/EP2020/058666. This method enables a corresponding structure to be formed precisely on a container.

In this case, a blow molding tool is preferably used, as described and claimed in the international patent application PCT/EP2020/058665. The molding tool described in this patent application has an exchangeable mold part. A negative structure for forming the region described here, i.e., the structure of the region, is preferably arranged on this mold part. Accordingly, the required structures can be provided by simple replacement of this mold part, for example for a separate batch of individual plastic containers. As soon as a first batch of plastic containers is manufactured, the mold part can be exchanged and replaced with a mold part that has a different negative structure.

The structure can be formed from uniformly arranged elevations and/or recesses.

This makes it possible to present specific surface effects, such as recurring patterns or a matte or glossy surface.

The structure can be designed as a reflection grating. The reflection grating can have a grating constant of less than 10 μm. Interference patterns, which can be used for an attractive design of the plastic container, are formed on such reflection gratings.

A reflection grating makes it possible to provide a structure which makes it possible to apply to the plastic containers holograms or the like, which make it possible, for example, to accommodate therein information relating to quality assurance and/or tracing, this information being readable, for example, by optical devices. Furthermore, a high-quality surface appealing to the customer can be created.

A further aspect of the present invention relates to a batch made up of a plurality of plastic containers as described herein. Each plastic container of this batch has, on a subportion of the surface, an arrangement of regions which is recurring in all plastic containers of the same batch.

This allows the simple assignment of a plastic container to a corresponding batch and thus to a corresponding production period.

A further aspect of the invention relates to a method for determining a property of a plastic container, in particular a plastic container as described herein. In the method, an arrangement of regions applied to the plastic container is compared to a reference arrangement. The corresponding property is determined on the basis of this comparison. The property is in particular the material of the plastic container, or the filling material, or and the production batch, or the deposit system assigned to the plastic container, or the manufacturer of the plastic container or of the filling material. It is naturally understood that combinations of a plurality of properties to form a reference arrangement can also be indicated and, consequently, a plurality of properties of the plastic container can be determined by a comparison of the applied arrangement of regions to a reference arrangement.

This enables in total the accommodation of a plurality of manufacturer-specific details on the container, without the details being immediately visible. A specific arrangement of letters, geometric shapes or symbols creates a pleasing appearance of the plastic container, the relevant information nevertheless being applied to the container.

The comparison is in particular a geometric and/or graphical comparison of the individual regions and the reference arrangement.

As already explained, the information can be processed by suitable reading devices. Information for the public and information which only the manufacturer or a certified testing agency can read out and contains details about the authenticity of the container and/or the filling material can be contained in the corresponding regions.

The arrangement of regions can be an arrangement recurring in a batch of plastic containers in all plastic containers.

This makes it possible, in particular, to ensure the traceability of plastic containers back to the manufacturer and, where applicable, also the traceability of the filling material. Based on an arrangement of regions which are constant per batch, all plastic containers which have the same arrangement of regions can, for example, be assigned to a corresponding production cycle.

The comparison between the arrangement on the plastic container and the reference arrangement can be carried out by means of digital image processing.

In particular, the arrangement on the plastic container is read out with a corresponding optical device, for example with a smartphone, or with the camera of a smartphone. By means of downstream digital image processing, the read-out information, i.e., the image of the arrangement of regions, can be compared to a corresponding reference arrangement. This can take place, for example, directly with a specific app on the reading device; alternatively, this can also be carried out at a central processing location, for example, on a company-internal server.

It can be provided that the plastic container has at least one second arrangement of regions. A second property can be assigned to this second arrangement of regions. Thus, the first arrangement of regions can, for example, have information about the container and the second arrangement of regions can, for example, have specific information about the filling material, for example, its ingredients.

The second arrangement can also be an individual authenticity feature per batch and/or per plastic container. The second arrangement of regions can likewise be a specific arrangement of individual regions as described in the present case.

Typically, the specific design of this arrangement with respect to the quality feature is known only to the manufacturer and stored in a corresponding database.

This makes it possible, in case of doubt, for example in the case of imported goods, to check whether the plastic container is an authentic product or a counterfeit.

Accordingly, a further aspect of the invention relates to a method for verifying the authenticity of a plastic container as described herein, or of a filling material contained therein. An individual arrangement of a plurality of regions is applied to each plastic container. The individual arrangement is provided by the position of two or more regions relative to one another, in particular by the distance between them, and/or by the rotation thereof relative to one another, and/or by a different combination of the structures of two or more regions. This individual arrangement is linked to corresponding authenticity information in a database.

In order to verify the authenticity, a corresponding arrangement on a plastic container is compared to the authenticity information stored in the database. If the arrangement of regions on the plastic container is an arrangement as is stored in the database, the container is an authentic container.

Figure 2:
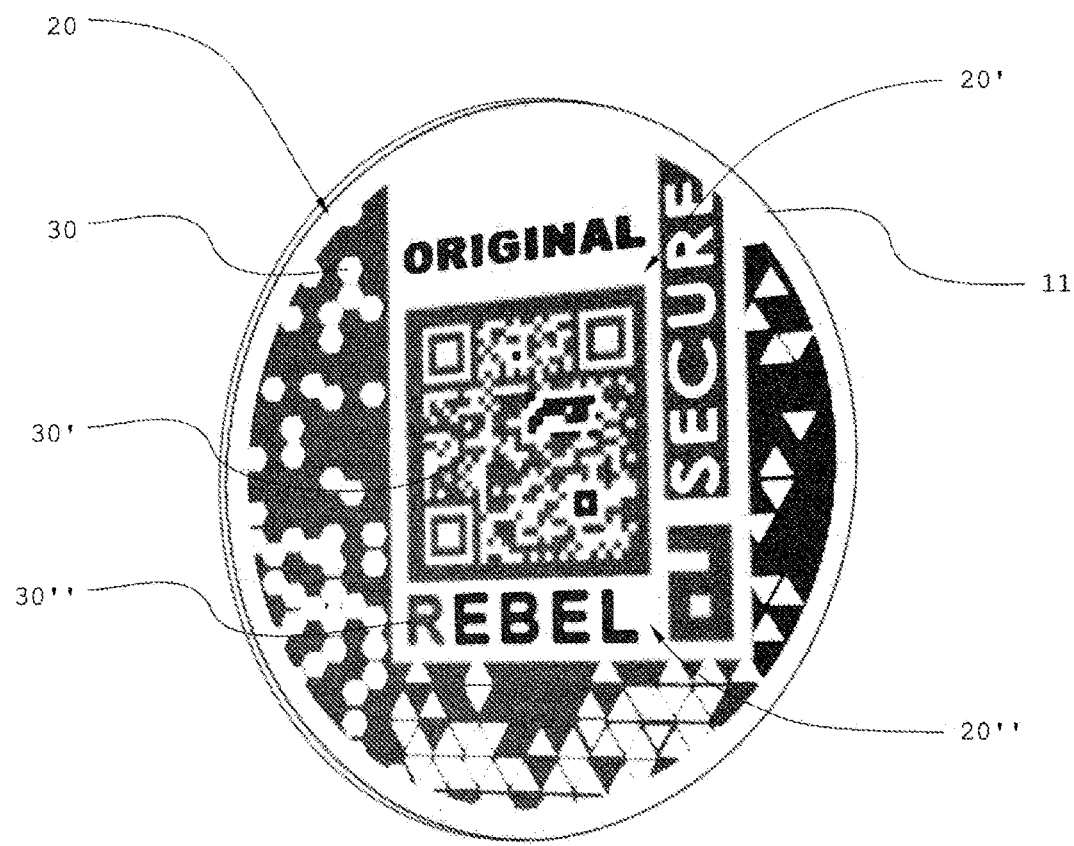
Figure 3:
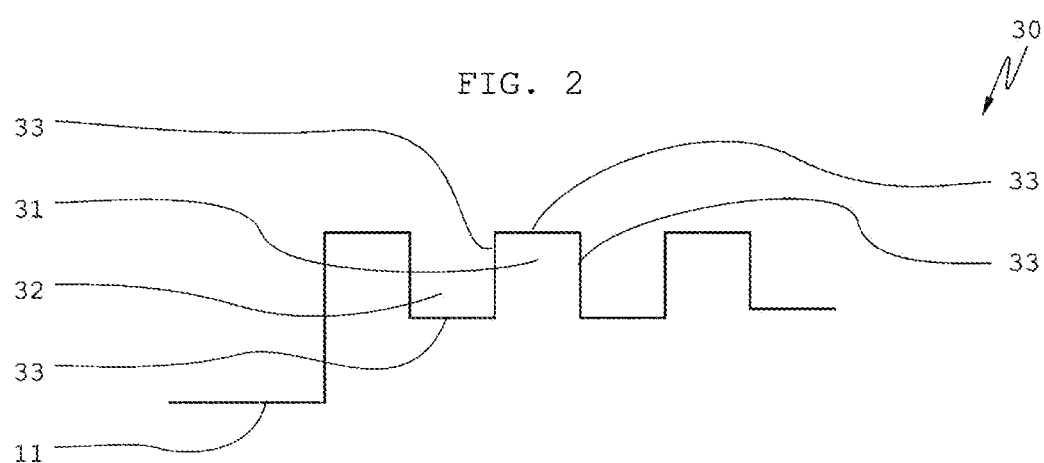

The invention is explained below with reference to figures. They show:

FIG. 1: a plastic container;
FIG. 2: a detail view of FIG. 1;
FIG. 3: a cross section through a region.

FIG. 1 shows a plastic container 100. The plastic container 100 has an interior space 101 which is delimited by a container wall 102. The container wall 102 has an inside (not denoted in detail) and an outside 10. Accordingly, the outside 10 has a surface 11. A plurality of arrangements 20 of a multiplicity of regions 30 (see FIG. 2) is arranged on this surface 11. For better clarity, only one arrangement 20 is provided with a reference sign.

FIG. 2 shows a detail view of FIG. 1. A detail of the surface 11 of the plastic container 100 of FIG. 1 is shown. A multiplicity of arrangements 20, 20', 20" is shown in this detail. The arrangement 20 has, for example, a multiplicity of hexagonal regions 30. For the sake of clarity, only one of the hexagonal regions 30 is provided with a reference numeral.

A second arrangement 20' is shown. This has the shape of a QR code. The QR code consists of a multiplicity of square elements. These square elements are designed as individual regions 30'. Here too, for the sake of clarity, only one of the square elements 30' is provided with your reference sign.

In the present Illustration, a further arrangement 20" is shown which is designed as lettering. The individual letters of this lettering are also designed as individual regions 30". Here too, for the sake of clarity, only one of the letters 30" is provided with your reference sign.

FIG. 2 illustrates further arrangements of regions which, however, are not discussed in more detail since they differ from the described regions only in relation to their arrangement and/or outer contours but can be designed to be comparable in their structure.

All regions 30, 30', 30" have a structure which are formed from elevations 31 and/or recesses 32. This is explained in detail below with reference to FIG. 3.

FIG. 3 shows a cross section through a region, in the present case through the region 30 of FIG. 2. The region 30 is formed raised in relation to the surface 11 of the container wall 102. The region has elevations 31 and recesses 32. Both the elevations 31 and the recesses 32 have boundary faces 33. The points at which the boundary faces 33 meet are shown in the present case as sharp corners or as sharp transitions. In fact, the formation of these transitions is not sharp-edged at these corners, i.e., at the virtual intersection points of the respective boundary faces. Rather, the boundary faces transition into one another with a radius. The radius is less than 5 μm.

A boundary face is defined substantially in that it extends substantially uniformly from a first sharp transition to a second sharp transition. In the present example, the boundary faces are thus defined by the connection of two intersection points; in other words, a boundary face extends along the connection of two intersection points.

The structure was described in the present case on the basis of the region 30 of FIG. 2. However, this design also applies to the further regions 30' and 30", these regions not necessarily having to have the same shape as shown in FIG. 3.

Returning to FIG. 2, it can be seen that the individual regions 30 of the arrangement 20 have a specific position and/or a specific distance from one another. This distance between and/or this position relative to one another can be stored as a reference arrangement in a corresponding database. It is possible here for this arrangement 20 to be the same for a batch of plastic containers 100. By comparing the present arrangement 20 on the plastic container 100 to the reference arrangement in the database, a property stored for this reference arrangement can be checked. This property may, for example, be a proof of authenticity. If the comparison does not yield any differences between the reference arrangement and the present arrangement 20, it can be assumed that the container is an original container.

In the present case, the second arrangement 20' is a QR code which is linked, for example, to an Internet address via which the information associated with this product, such as ingredients, can be retrieved.

The third arrangement 20" may be a manufacturer name. The regions 30" of the third arrangement 20" can also have a structure assigned to the specific manufacturer. If the manufacturer information of the arrangement 20" and the associated regions 30" correspond, the authenticity of the plastic container can also be assumed.

As can be seen from FIG. 2, further arrangements can be provided, in the present case, for example, made up of triangles. Additional information about the container itself, such as the material from which it is manufactured, can be contained, for example, in this arrangement. In other words, this arrangement can also be compared to a corresponding reference arrangement, the corresponding information being stored for the respective reference arrangement.

The invention claimed is:

1. A plastic container (100) produced in an extrusion blow molding method or in an injection blow molding method (IBM), the plastic container (100) having a container wall (102) with an outside (10) and an inside, a surface (11) of the outside (10) having a structure at least in a first region (30), said structure being formed by elevations (31) and/or recesses (32), each elevation (31) or recess (32) having one or more boundary faces (33), wherein
a transition from a first boundary face (33) to a second boundary face (33) or to the surface (11) of the container wall (102) has a radius that is less than or equal to 5 μm.

2. The plastic container (100) according to claim 1, wherein
the region (30) in the surface (11) is formed raised or recessed in the form of a character, a geometric figure or a symbol.

3. The plastic container (100) according to claim 2, wherein
the region (30) has a mean height or a mean depth which does not exceed 25 μm.

4. A batch made up of a plurality of plastic containers (100) according to claim 2, wherein each plastic container (100) of this batch has, on a sub-portion of the surface (11), an arrangement of regions (30) which is recurring on all plastic containers (100) of the same batch.

5. The plastic container according to claim 1, wherein
the surface (11) has a plurality of regions (30) which are arranged in a form of a QR code or a barcode in such a way that the plurality of regions represent machine-readable information.

6. The plastic container (100) according to claim 5, wherein
the machine-readable information contains details about a material of the plastic container (100) or about a filling material or about a production batch or about a deposit system assigned to the plastic container (100) or about a manufacturer of the plastic container (100) or the filling material.

7. The plastic container (100) according to claim 5, wherein
the machine-readable information is provided by a position of two or more of the regions (30) relative to one another, in particular by a distance between them, and/or by a rotation thereof relative to one another, and/or by a different combination of the structures of the two or more regions.

8. The plastic container (100) according to claim 1, wherein
the plastic container (100) is made of a polyolefin, in particular of polypropylene or HDPE.

9. The plastic container (100) according to claim 1, wherein
the structure is formed from uniformly arranged elevations (31) and/or recesses (32).

10. The plastic container (100) according to claim 1, wherein
the structure is designed as a reflection grating.

11. A method for determining a property of a plastic container (100) according to claim 1, wherein an arrangement of regions (30) applied to the plastic container (100) is compared to a reference arrangement and the corresponding property is determined on the basis of this comparison, the property being a material of the plastic container (100) or a filling material or a production batch or a deposit system assigned to the plastic container (100) or a manufacturer of the plastic container (100) or the filling material.

12. The method according to claim 11, the arrangement of regions (30) being an arrangement (20) recurring in a batch of plastic containers (100) in all plastic containers (100).

13. The method according to claim 11, wherein the comparison between the arrangement (20) on the plastic container (100) and the reference arrangement is carried out by means of digital image processing.

14. The method according to claim 11, wherein the plastic container (100) has at least one second arrangement (20) of regions (30) which is assigned a second property.

15. The method according to claim 14, the second arrangement (20) being an individual authenticity feature per batch and/or per plastic container (100).

16. The method for verifying the authenticity of a plastic container (100) according to claim 1, or of a filling material contained therein, wherein an individual arrangement (20) of a plurality of regions (30) is applied to each plastic container (100), the individual arrangement (20) being provided by a position of two or more regions (30) relative to one another, by a distance between them, and/or by a rotation thereof relative to one another, and/or by a different combination of the structures of the two or more regions (30), and this individual arrangement (20) being linked to corresponding authenticity information in a database.

17. The plastic container (100) according to claim 1, wherein the transition from the first boundary face (33) to the second boundary face (33) or to the surface (11) of the container wall (102) has a radius that is less than or equal to 1 µm.

18. The plastic container (100) according to claim 1, wherein the transition from the first boundary face (33) to the second boundary face (33) or to the surface (11) of the container wall (102) has a radius that is less than or equal to 0.5 µm.

* * * * *